United States Patent [19]
Raynaud et al.

[11] Patent Number: 5,764,514
[45] Date of Patent: Jun. 9, 1998

[54] METHOD FOR MODELLING KINEMATIC SEISMIC DATA PROCESSED WITH AT LEAST ONE MOTION OPERATOR

[75] Inventors: Bernard Raynaud, Middlesex, Great Britain; Etienne Robein, Jurençon, France

[73] Assignee: Elf Aquitaine Production, Courbevoie, France

[21] Appl. No.: 549,712

[22] PCT Filed: Mar. 10, 1995

[86] PCT No.: PCT/FR95/00280

§ 371 Date: Nov. 13, 1995

§ 102(e) Date: Nov. 13, 1995

[87] PCT Pub. No.: WO95/24659

PCT Pub. Date: Sep. 14, 1995

[30] Foreign Application Priority Data

Mar. 11, 1994 [FR] France ................... 94 02842

[51] Int. Cl.⁶ ............................................. G01V 1/28
[52] U.S. Cl. ........................... 364/420; 364/400; 364/421; 367/38; 367/53; 367/73
[58] Field of Search ........................ 364/400, 420, 364/421, 422, 578; 367/38, 50, 51, 52, 53, 56, 73

[56] References Cited

U.S. PATENT DOCUMENTS

| | | | |
|---|---|---|---|
| 4,736,347 | 4/1988 | Goldberg et al. | 364/421 X |
| 4,839,869 | 6/1989 | Cocoran | 367/53 |
| 4,878,204 | 10/1989 | Black et al. | 367/53 |
| 4,888,742 | 12/1989 | Beasley | 367/53 |
| 4,964,089 | 10/1990 | Wang et al. | 367/73 |
| 5,051,960 | 9/1991 | Levin | 367/38 X |
| 5,083,297 | 1/1992 | Ostrander | 364/421 |
| 5,128,899 | 7/1992 | Boyd et al. | 367/50 |
| 5,157,637 | 10/1992 | Wang | 367/38 |
| 5,463,594 | 10/1995 | Lindsey et al. | 367/38 |
| 5,508,914 | 4/1996 | Lee | 364/421 |
| 5,570,321 | 10/1996 | Bernitsas | 367/38 |
| 5,583,825 | 12/1996 | Carrazzone et al. | 364/421 X |

FOREIGN PATENT DOCUMENTS

| | | |
|---|---|---|
| 2697347 | 4/1994 | France . |
| 2226884 | 7/1990 | United Kingdom . |
| 9218883 | 10/1992 | WIPO . |

OTHER PUBLICATIONS

First Break, vol. 4, London, S. M. Deregowsky, "What is DMO?", Jul. 1986, pp. 8–24.

Siam J., Appl. Math., Philadelphia, PA, H.B. Keller et al., "Fast Seismic Ray Tracing"; vol. 43, No. 4; pp. 981–992, 1983.

Geophysical Prospecting, vol. 41, The Hague NL., M. Dietrich et al., "Migration to Zero Offset (DMO) for constant velocity gradient: An analytical formulation"; pp. 621–643; 1993.

*Primary Examiner*—Edward R. Cosimano
*Attorney, Agent, or Firm*—Ostrolenk, Faber, Gerb & Soffen, LLP

[57] ABSTRACT

A method of modelling at least travel time and apparent dip from seismic data that has been processed by at least one migration operator comprising the steps of taking the midpoint ($N_1$) of a source (S)/receiver (R) system, applying ray tracing to the system relative to a given reflector, processing the parameters of the ray using a migration operator to obtain a first point of arrival ($N'_1$) marked on the model, determining the offset ($\Delta e1$), and proceeding iteratively at each new point of arrival ($N'_i$) until the offset ($\Delta E$) is less than or equal to the predetermined offset ($\Delta e$).

12 Claims, 3 Drawing Sheets

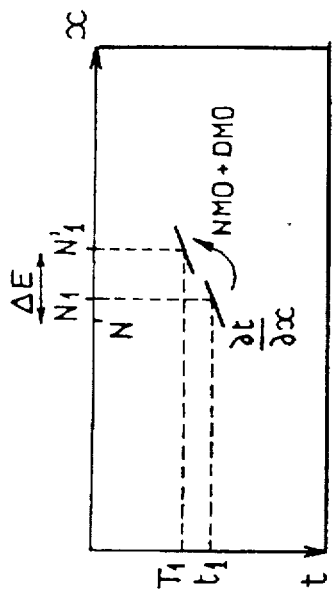
FIG_1A
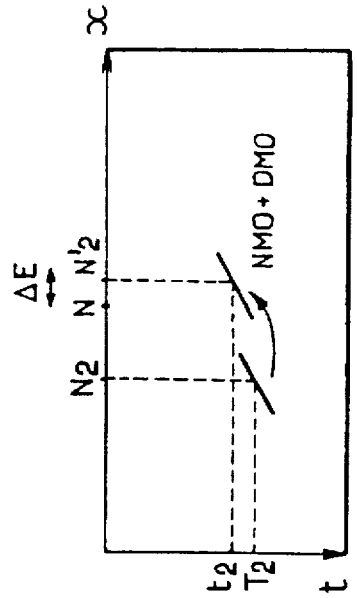
FIG_1B
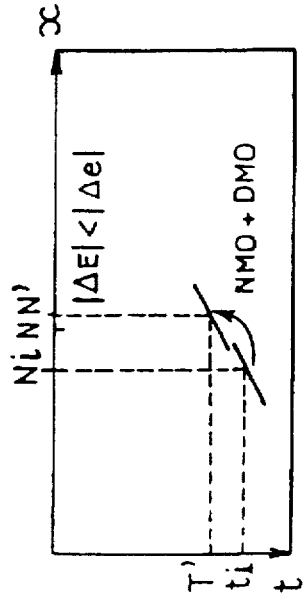
FIG_1C
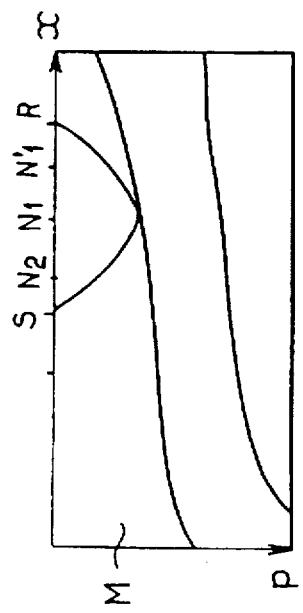
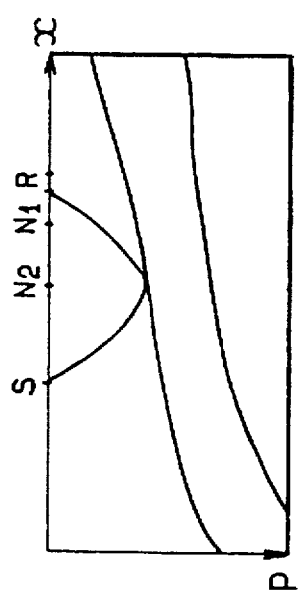
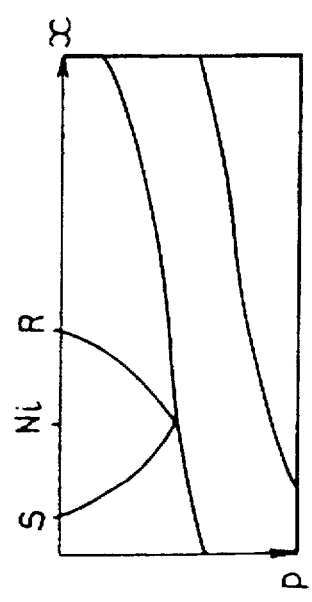

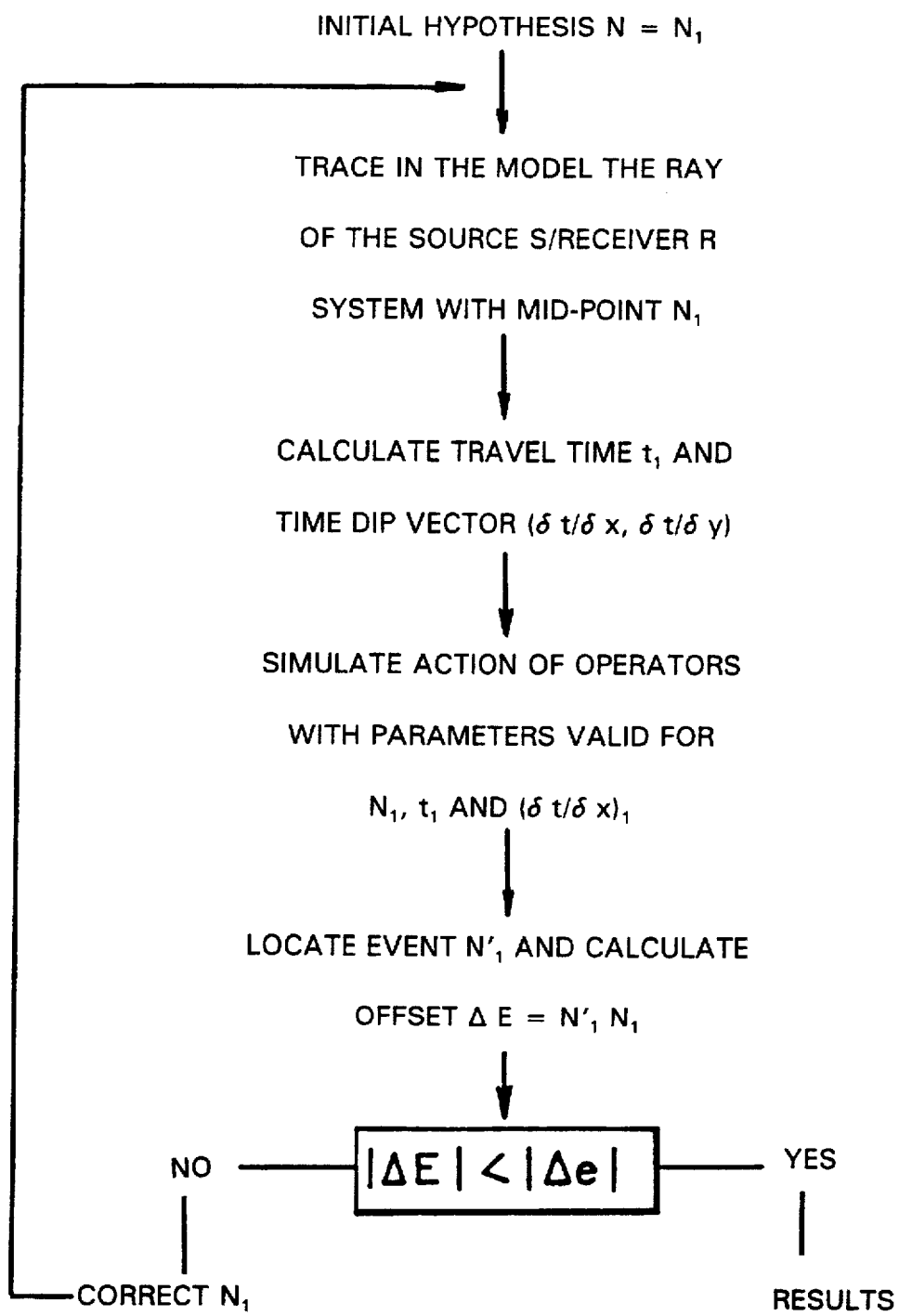
FIG_2

5,764,514

METHOD FOR MODELLING KINEMATIC SEISMIC DATA PROCESSED WITH AT LEAST ONE MOTION OPERATOR

BACKGROUND OF THE INVENTION

1. Field of the Invention

The present invention concerns a method of modelling kinematic seismic data and, more particularly, a method of producing a three-dimensional model of kinematic seismic data; that has been processed by at least one migration operator.

2. Related Art

The expression "migration operators" refers to processes that reposition the seismic energy. These processes are well known to those skilled in the art and some forms of them are mentioned later in the description.

To determine the geometrical subsurface structure of the earth it is standard practice, in oil prospecting, to study the subsurface propagation of elastic or acoustic waves emitted by sources on the surface of the earth at points known as "shot points". The subsurface waves are reflected by reflectors existing in the various boundaries between layers and therefore return to the surface where they cause time-varying vibrations which may be by receivers of a data acquisition device at points called "receiving points". Each of these recordings is associated with the position of a mid-point at the middle of a straight line segment joining the shot point and the receiving point associated with the record. The data acquisition device is adapted such that a plurality of different records can be associated with the same mid-point or with the same area on the surface (or "bin") and the various mid-points, which are usually equidistant from each other, are aligned on a line called the seismic profile or lie on a grid which is usually a regular grid ("3D grid").

Each record in the collection of records associated with the same mid-point is known as the common-mid-point (CMP) gather. These records are processed to correct for the effects of the oblique path followed by the acoustic wave as a function of the distance between the shot point and the receiving point. Thus the record is referred to as the theoretical time corresponding to shot and receiving points coincident at their initial mid-point, i.e. to a zero source-receiver offset. The dynamic corrections known as NMO (Normal Move Out) corrections that correct for the effects of the oblique acoustic paths are dependent on speeds known as "stacking speeds" and in theory allow simulation of the record that would have been obtained if the shot point and the receiving point had been at the mid-point. Stacking of the corrected records of each gather provides a stack records called "stack-traces", the juxtaposition of which (according to the coordinates of the mid-point or the center of the bin) constitute the "3D stack seismic block". The 3D stack seismic block may be regarded as a distorted three-dimensional image of the subsurface structure, with time along the vertical axis and two distances along the horizontal axes.

However, the NMO corrections are based on a number of limiting hypotheses. A form of processing called DMO (Dip Move Out) was therefore developed and is now in extremely widespread use. It is usually applied to the seismic data before stacking (pre-stack), but after NMO correction, in order to eliminate as much as possible of the effect of reflector dip on the stack speeds as possible. A detailed description of the DMO operator is given in an article entitled "What Is DMO?" by S. M. DEREGOWSKI, FIRST BREAK, Vol. 4, No. 7, pp.7–24 July 1986, and in other publications, for example, U.S. Pat. No. 4,878,204.

However, the DMO operator is based on a relatively simple hypotheses. More complex operators are therefore applied to the seismic data, including the "pre-stack time migration" operator.

Having obtained a satisfactory 3D stack seismic block and the corresponding set of stack speeds, the "3D time migration" step is usually executed. The object of migration is to provide the interpreter with an acoustic image of the subsurface structure that resembles (as closely as possible) a geological image. However, the processing by the time migration operator is based on a simplified version of the wave equation and does not take into account the finer details of the subsurface propagation velocity field. Although is efficacious, stable and provides an image that is easy to interpret, the approximations involved lead to an inaccuracy in the spatial location of seismic events.

Another method of processing seismic data is to create a depth image of the subsoil that is as accurate as possible. This is called "depth migration" if all of the seismic data is used or "map migration" if only the depth of a trace interpretating seismic events is converted.

Both techniques require a depth model of the subsurface velocities to be defined beforehand.

Various methods of obtaining these velocity models, called macromodels, are described in the literature. Reference may usefully be made to the article by E. LANDA et al "A Method For Determination Of Velocity And Depth From Seismic Reflection Data", "GEOPHYSICAL PROSPECTING", No. 86, pp. 22–243, 1988.

Another method for depth modelling of subsurface velocities is to "demigrate" migrated interpretations. A method of this kind was described by WHITCOMBE at the 1991 SEG congress. The "demigration" proposed by WHITCOMBE is based on a kinematic calculation of the premigrated position of a plurality of points regularly distributed across the nodes of a mesh and defining a migrated surface. However, the points of the regular distribution all demigrate independently of the others. The drawback of this is that the demigrated surface is calculated from a series of points and obtaining a regularly meshed demigrated surface from these points is a difficult interpolation exercise.

All existing methods require either: (i) modelling of the seismic data or information for a series of positions, followed by simulation by the operator of each of these positions and interpolation of the post-operator results to determine the events at the positions of interest,; or (ii) application of approximate corrective formulas to the modeled or measured times used.

SUMMARY OF THE INVENTION

An object of the present invention is to propose a simple method for estimating the travel times of seismic reflections observed at any point on the surface before or after dynamic (NMO) corrections and after processing by a migration operator or any sequence of migration operators.

A further object of the present invention is to simulate the precise action of the migration operators with the actual parameters used, so as to simulate the seismic events that are observed in practice rather than those which would be observed with an ideal migration operator having perfect parameters.

For example, the DMO operator is usually applied to eliminate the dip effect on the stacking speeds but the standard forms of the DMO operator assume a constant subsurface velocity. As a result, the standard DMO operator eliminates only part of the dip effect in a variable subsurface velocity model.

In accordance with the present invention it is possible to determine (in a three dimensional subsurface model) the travel times of a seismic reflection and the apparent time dip observed at any position after that reflection has been operated on by one or more migration operators.

The time dip is the vector ($\delta t/\delta x$, $\delta t/\delta y$), i.e. the derivative of time with respect to the coordinates.

The present invention can be applied to a subsurface model including a detailed description of the geometry of the reflectors and the subsurface properties governing seismic propagation, particularly anisotropic parameters and propagation velocity laws.

The present invention is also applicable if the kinematics of the migration operators are described by means of analytical functions, mathematical formulas or any other digitized form of real or theoretical impulse responses of operators that are themselves defined in terms of adequate parameters.

Useful applications of the present invention include:

simulation of stacking speeds observed in data processed by the DMO operator;

simulation of stacking speeds that have been subjected to pre-stack time migration and or depth migration;

simulation of events corresponding to the subsurface geometries of interest observed on seismic sections subjected to time migration with an approximate velocity field.

All these functions can be used in the tomographic methods used to establish a geometrical subsurface model.

The migration operators include, for example:

the constant speed DMO operator (i.e. a seismic section processed first by NMO, next by constant velocity DMO and then by inverse NMO).;

KIRCHHOFF type post-stack time migration, i.e. migration by stacking on a hyperbola.;

effective prestack migration effected by the sequence comprising NMO, constant velocity DMO, constant velocity post-stack time migration and inverse NMO.;

DMO with velocity varying with depth, as described by DIETRICH and COHEN in GEOPHYSICAL Prospecting, No. 41, pp. 621–643, 1993, and depth migration (by normal incidence inverse ray tracing).

It is also possible to apply the present invention to a seismic section processed by several of these operators in succession.

The applications of the method of the invention include, for example: inversion of stacking or addition speeds after DMO, i.e. obtaining a subsurface velocity model by tomographic means from times observed (for example) after time migration and stacking speeds calculated (for example) after DMO.;

confirmation of whether DMO, which is usually valid for low velocity variations, improves the quality of the seismic information or not, in cases where the subsurface structure is somewhat complicated.;

identification of artifacts in an interpretation based on a migrated section, for example verification of whether a selected event conforms to the geometry of a hypothetical horizon.

The method of the present invention is particularly beneficial for modelling seismic data or information such as:

the travel time in a time migrated section with no offset when the subsurface velocity model and the velocity model used for the migration are known.;

the travel times in a common mid-point (CMP) gather of processed traces, when the subsurface velocity model and the velocity model used in the NMO, DMO, inverse NMO processing sequence are known.;

the travel times in a CMP gather of traces after pre-stack time migration when the subsurface velocity model and the velocity models used in the NMO, DMO, time migration NMO processing sequence are known.

The method of the invention can be used indirectly to determine:

the depth of an identified horizon in a time-migrated section when the subsurface velocity model and the velocity model used in the migration are known; and the real or true depth of an identified horizon in a depth migration section when the subsurface velocity model and the velocity model used in the depth migration are known.

The method of the invention includes in the following steps:

a) a model is used representing reflectors of a medium and velocity laws in at least one layer of said medium;

b) a reference point (N) is defined on the surface of the model and a first starting point ($N_1$) is defined coincident with or near said reference point, said first starting point ($N_1$) constituting the mid-point of a source-receiver system having a predetermined and constant offset;

c) ray tracing is effected in the model for the source-receiver system having the mid-point ($N_1$) and relative to a predetermined reflector of said model, and parameters of said ray are determined such as at least the travel time and the apparent dip for the source-receiver system and the reflector in question;

d) said parameters are processed by means of at least one migration operator to obtain a first point of arrival ($N'_1$) that is marked on the model, said first point of arrival ($N'_1$) imaging the first starting point departure ($N_1$) after application of said migration operator;

e) the offset ($\Delta E$) between the reference point (N) and the first point of arrival ($N'_1$) is determined and said offset ($\Delta E$) is compared with a predetermined offset ($\Delta e$);

f) a second starting point ($N_2$) is chosen on the opposite side of the reference point (N) relative to the first point of arrival ($N'_1$);

g) steps c) through f) are executed for each new point of arrival ($N'_i$) until, for a final point of arrival ($N'$), the offset ($\Delta E$) is less than or equal to the predetermined offset ($\Delta e$); and h) the final point ($N'$) of the model and the parameters of the corresponding ray are stored in memory.

The parameters of the ray mentioned in step c) above are determined by calculation methods familiar to those skilled in the art and allow for the model used, as previously mentioned.

The features or parameters of the migration operator(s) used to process the parameters of said ray can be those that are related to the position of the mid-point itself, the migration operator(s) being defined either by a mathematical formula or by another known relationship.

If necessary, the features or parameters of the migration operator(s) used in the processing, which correspond to the starting point ($N_i$) or to the image point ($N'_i$), such as the azimuth of the source-receiver system, NMO correction speed, etc, are determined.

One advantage of the present invention is that the real action of the processing operators is modeled rather than an idealization of them based on the hoped for actions of said operators. For example, it is preferable to simulate the DMO kinetics on the modeled events rather than to assume that the DMO has totally eliminated dip effects on the stack speeds. This is because most of the algorithms used are approximate since they were designed to work under ideal conditions that may not be satisfied in the model under study.

Other advantages and features will appear more clearly from a reading of the following description and from the appended drawings.

BRIEF DESCRIPTION OF THE DRAWINGS

FIG. 1A through 1C are synoptical representations in two dimensions (x, t) applied to a seismic section processed by a migration operator such as a DMO or a time migration operator, accordance with the method of the invention;

FIG. 2 is a flowchart for the steps of the method shown in figures 1A through 1C.

DETAILED DESCRIPTION OF THE PREFERRED EMBODIMENT

Figure 3A:
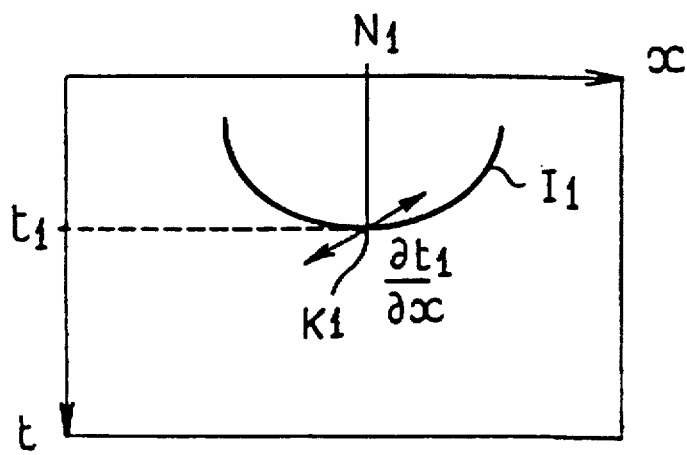
FIGS. 3A through 3C are two-dimensional representations of an impulse response of a migration operator used in the present invention.

With reference to FIGS. 1A–1C, in a first application of the method of the invention, the aim is to determine the time and the time dip of a reference point N on the surface of a model M after it has been operated on by one or more migration operators, for example a constant speed DMO operator. The model M represents horizons H or reflectors of the medium concerned and velocity laws in at least one layer of said medium, together with anisotropic parameters.

A source S/receiver R system with a predetermined offset that remains the same throughout the application of the method is chosen. The mid-point $N_1$ of said source-receiver system is near the reference point N, for example coincident with N, and is taken as the first point of departure.

Another step performs ray tracing, familiar to those skilled in the art, from the point S to the point R across the model and for a given horizon H. The time $t_1$ and the time dip vector $\delta t_1/\delta x$ at $N_1$ are deduced therefrom.

In a representation in two dimensions (x, t), the time dip vector is $\delta t/\delta x$. In a representation in three dimensions (x, y, t), the time dip vector has the components $\delta t/\delta x$ and $\delta t/\delta y$.

In another step, one or more migration operators are applied at time $t_1$ and to the time dip $\delta t_1/\delta x$. In particular, the starting point $N_1$ is operated on by the NMO operator corresponding to a predetermined RMS (Root Mean Square) velocity and then the migration operator, for example the constant speed DMO operator, to obtain the position of the first point of arrival N'$_1$ and in particular the time $T_1$ and the time dip $\delta T_1/\delta x$.

The offset $\Delta E$ between the first point of arrival N'$_1$ and the reference point N is then determined and compared to a predetermined offset $\Delta e$ that is necessarily small since the event relative to the reference point N is what is of interest.

With reference to FIG. 1B.; if the offset $\Delta E$ is unacceptable, another starting point $N_2$ is chosen on the opposite side of the reference point N compared to the first point of the arrival N'$_1$, and preferably such that $N_2 N_1$ is near $N_1 N'_1$.

The starting point $N_2$ constitutes the middle of the constant offset source S/receiver R system and ray tracing corresponding to the point $N_2$ Is effected. The parameters of the ray are processed by the migration operator to obtain a second point of arrival N'$_2$ the position of which, as an offset relative to the reference point N, is compared to the predetermined offset $\Delta e$.

With reference to FIGS. 1C and 2,; one or more further iterations are performed choosing other starting points $N_i$, simulating the migration operator each time and using parameters appropriate to its location, until a final point N' deemed to be acceptable is obtained.

The final point N' is then stored in memory along with, for example, the travel times, the parameters of the ray corresponding to the mid-point of the source-receiver system the image of which is N', deemed to be sufficiently close to the reference point N. In particular, the position of the reference point N is stored in memory along with the time t and the time dip vector $\delta t/\delta x$ before application of the migration operator and the time T and time dip $\delta t/\delta x$ after application of said migration operator.

In a second application of the method of the invention, the aim is to determine the stacking speed modeled at a given position after application of the DMO migration operator for a gather of traces having the same common mid-point and different source-receiver systems. A first step is the same as for the previous application for a first source-receiver system that is defined by its azimuth and its corresponding offset.

The method is completed by applying to the time thus found the inverse NMO operator corresponding to the predetermined RMS speed applicable at the given position.

The above step is repeated for all of the source-receiver systems under study.

A final step deduces the stacking speed for offset-time pairs using regressive methods familiar to those skilled in the art.

In the tomographic method, well known to those skilled in the art, travel times or stacking speeds calculated on a model have to be compared to travel times and stacking speeds measured from seismic data. The seismic data has usually undergone constant offset section DMO processing, and sometimes time migration. The method of the invention takes correct account, at the required location without interpolation, of the processing to which the seismic data has been subjected and thus facilitates determination of said travel times and/or stacking speeds. This substantially improves the tomographic technique.

The method described above can be used to simulate the following migration operators:

the DMO operator assuming a constant velocity, i.e. the NMO, constant velocity DMO and inverse NMO sequence,;

the null offset migration using an RMS (Root Mean Square) velocity field,;

the "pre-stack" null offset migration, i.e. migration applied to constant offset sections on which the NMO and DMO operators have operated.

An aspect of the method of the invention is that its implementation is particularly effective If ray tracing replaced by the "Ray-Bending" technique (see, for example, "Fast Seismic Ray Tracing", H. B. KELLER and D. J. PEROZZI, SIAM J APPL MATH, VOL 43 No. 4, Aug. 1983.

Conventional "Ray-Bending", used instead of ray tracing, mentioned in the description, keeps the source and the receiver fixed and shifts one or more of the nodes (intersections of the geometrical path with the various reflectors or strata encountered on the path between the source and the receiver, after passing through the medium) including the point of reflection, until the travel time is minimized.

This is usually done iteratively. On each iteration one or more nodes are migrated in a direction defined by a gradient such that the overall travel time is reduced.

In the method of the invention this "Ray-Bending" is improved by also migrating the source and the receiver. These particular nodes are shifted during the iterations mentioned above, using the method defined above, for the mid-point and so as to respect the local azimuth and the offset of the source-receiver system. The shifting of these particular nodes or other nodes can allow for the curvature of the interfaces (reflectors) and their dip and in particular the curvature and the dip of the reflector in question.

Another aspect of the method of the invention is that the migration operator can be defined by its impulse response, on which there are no restrictions. In this particular case, the shift, the time and the new dip after application of the operator can be calculated on the basis of the initial time and time dip ($\delta t_1/\delta x$) according to the scheme shown in FIG. 3A. This scheme is for two dimensions, but can be generalized to three dimensions, for example by applying the method in the x direction and in the y direction.

FIG. 3A shows the migration operator $I_1$, to be applied at point $K_1$ with coordinates x, $t_1$ and corresponding to the surface point $N_1$.

Figure 3B:
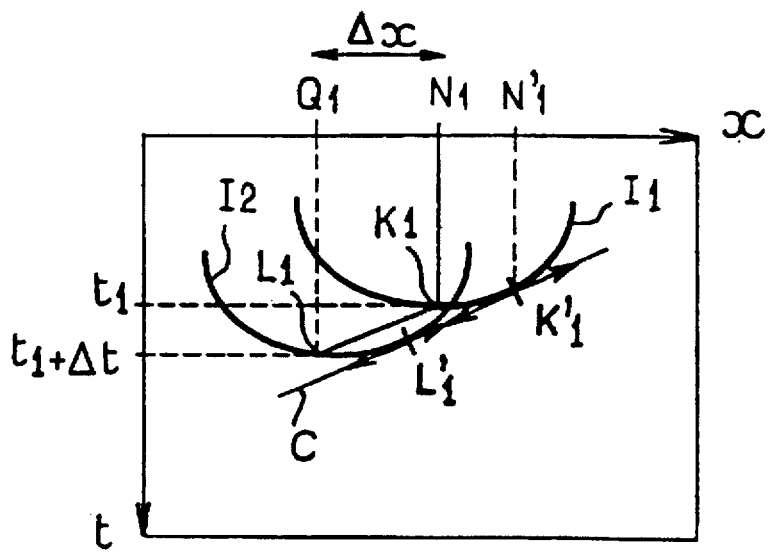

FIG. 3B shows, in addition to the migration operator $I_1$, the migration operator $I_2$ to be applied at point $L_1$ with ordinate $t_1+\Delta t$ and corresponding to a second surface point $Q_1$ at a distance $\Delta x$ from $N_1$, with the result that $\Delta t/\Delta x$ is equal to the dip $\delta t/\delta x$ of the ray.

The image point $N'_1$ is defined by the surface point vertically above the point $K'_1$ where the common tangent $C(L'_1, K'_1)$ to the impulse responses $I_1$ and $I_2$ is tangential to the impulse response $I_1$, and the slope of the tangent at $K'_1$ defines the new time dip after application of the operator.

Figure 3C:
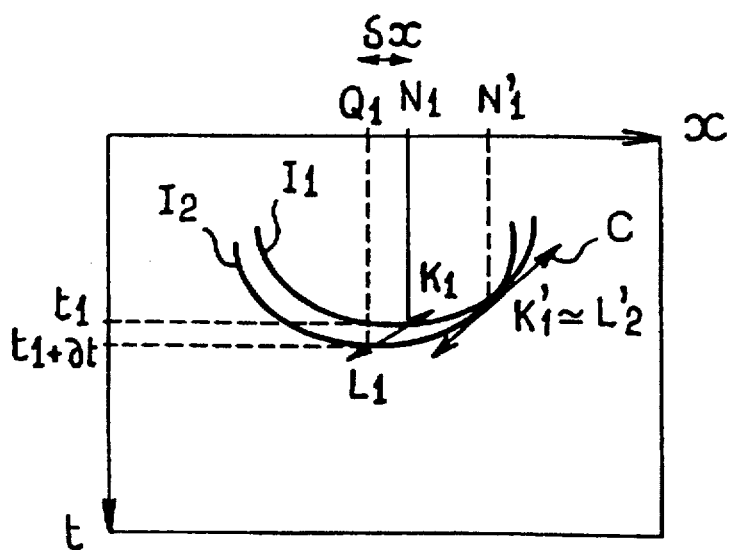

The method can be improved (FIG. 3C) by taking for $\Delta x$ a sufficiently small value $\delta x$ for the search for the common tangent to be simplified with a good degree of approximation to the search for the point of intersection of the two curves. The time dip searched for will be the slope of the operator at the point of intersection.

The search for the common tangent $C(L'_1 K'_1)$ at the point of intersection $K'_1$ when $\delta x$ is small can be effected using the well known numerical methods, whether the migration operator is known in the form of an analytical formula or given in the form of a table of pairs of values (x, t) or in any other form compatible with computer processing.

We claim:

1. A method of modelling at least travel time and apparent dip from seismic data that has been processed by a migration operator, comprising the steps of:

a) providing a model representing reflectors of a medium and velocity laws in at least one layer of said medium;

b) defining a reference point (N) on the surface of said model and a first starting point ($N_1$) which is coincident with or near said reference point, said first starting point ($N_1$) constituting the mid-point of a source-receiver system having a predetermined and constant offset;

c) performing ray tracing in the model for the source-receiver system having the mid-point ($N_1$) and relative to a predetermined reflector of said model, said ray being defined by parameters including at least travel time and apparent dip, and determining said parameters for said source-receiver system and said predetermined reflector;

d) processing said parameters using at least one migration operator to obtain a first point of arrival ($N'_1$) that is marked on the model, said first point of arrival ($N'_1$) imaging the first starting point ($N_1$) after application of said migration operator;

e) determining the offset ($\Delta E$) between the reference point (N) and the first point of arrival ($N'_1$) and comparing said offset ($\Delta E$) with a predetermined offset ($\Delta e$);

f) selecting a second starting point ($N_2$) on the opposite side of the reference point (N) relative to the first point of arrival ($N'_1$);

g) performing steps c) through f) for new starting points ($N_i$) until, for a final point of arrival (N'), the offset ($\Delta E$) is less than or equal to the predetermined offset ($\Delta e$); and h) storing the final point position (N') and at least the travel and apparent dip parameters of the corresponding ray, said parameters representing the modeled travel time and apparent dip.

2. The method according to claim 1, wherein the method is applied to each reflector of the medium.

3. The method according to claim 1, wherein the method is applied to each offset of a gather of traces having a common mid-point or common bin.

4. The method according to claim 1, wherein the migration operator is a DMO operator.

5. The method according to claim 1, wherein the migration operator is a pre-stack migration operator.

6. The method according to claim 1, wherein the migration operator is a post-stack migration operator.

7. The method according to claim 1, wherein the migration operator is a combined DMO and migration operator.

8. The method according to claim 1, wherein the migration operator is described by analytical functions.

9. The method according to claim 1, wherein the method is used to obtain a tomography.

10. The method of claim 1, wherein the migration operator is described by an impulse response.

11. The method according to claim 1, wherein the ray tracing in the model is effected by a known Ray-Bending technique that entails fixedly maintaining the source and the receiver and displacing one or more nodes including the point of reflection until the travel time is minimized.

12. The method according to claim 11, wherein the Ray-Bending technique is altered by shifting the source and the receiver while maintaining a constant source-receiver system offset, other characteristics such as the azimut being adapted to suit the location of the receiver system.

* * * * *